United States Patent [19]
Yasuki et al.

[11] Patent Number: 5,161,003
[45] Date of Patent: Nov. 3, 1992

[54] COMPATIBLE TELEVISION SYSTEM WITH COMPANDING AUXILIARY SIGNAL

[75] Inventors: Seijiro Yasuki; Kiyoyuki Kawai; Noboru Taga, all of Kanagawa, Japan

[73] Assignee: Kabushiki Kaisha Toshiba, Kanagawa, Japan

[21] Appl. No.: 667,297

[22] Filed: Mar. 11, 1991

[30] Foreign Application Priority Data

Mar. 13, 1990 [JP] Japan .................. 2-63331

[51] Int. Cl.⁵ ............... H04N 7/00; H04N 11/00
[52] U.S. Cl. ......................... 358/141; 358/12
[58] Field of Search ........... 358/141, 142, 146, 11, 358/12

[56] References Cited

U.S. PATENT DOCUMENTS

| | | | |
|---|---|---|---|
| 4,598,314 | 7/1986 | Reimers | 358/140 |
| 4,855,824 | 8/1989 | Fuhrer | 358/133 |
| 5,014,116 | 5/1991 | Kawai | 358/12 |

FOREIGN PATENT DOCUMENTS 2-142288  5/1990  Japan .

OTHER PUBLICATIONS

Jack S. Fuhrer, "Advanced Compatible Television," ITEJ Technical Report, vol. 12, No. 30, pp. 61-88, TEBS' 88-25 (Aug. 1988).

*Primary Examiner*—James J. Groody
*Assistant Examiner*—Safet Metjahic
*Attorney, Agent, or Firm*—Finnegan, Henderson, Farabow, Garrett and Dunner

[57] ABSTRACT

A compatible television signal encoder for encoding a television signal having a first signal and a second signal. The decoder includes a divider for dividing the wide aspect television signal into a main signal having the first signal and low-frequency components of the second signal multiplexed in the horizontal overscan regions of the first signal and an auxilary signal, an interpolator for producing an interpolating scanning field signal using a first scanning field signal of the main signal output from the divider, a field switch for replacing a second scanning field signal of the main signal with the interpolating scanning field signal output from the interpolator and an adder for adding the auxiliary signal from the divider to the signal output from the field switch.

8 Claims, 19 Drawing Sheets

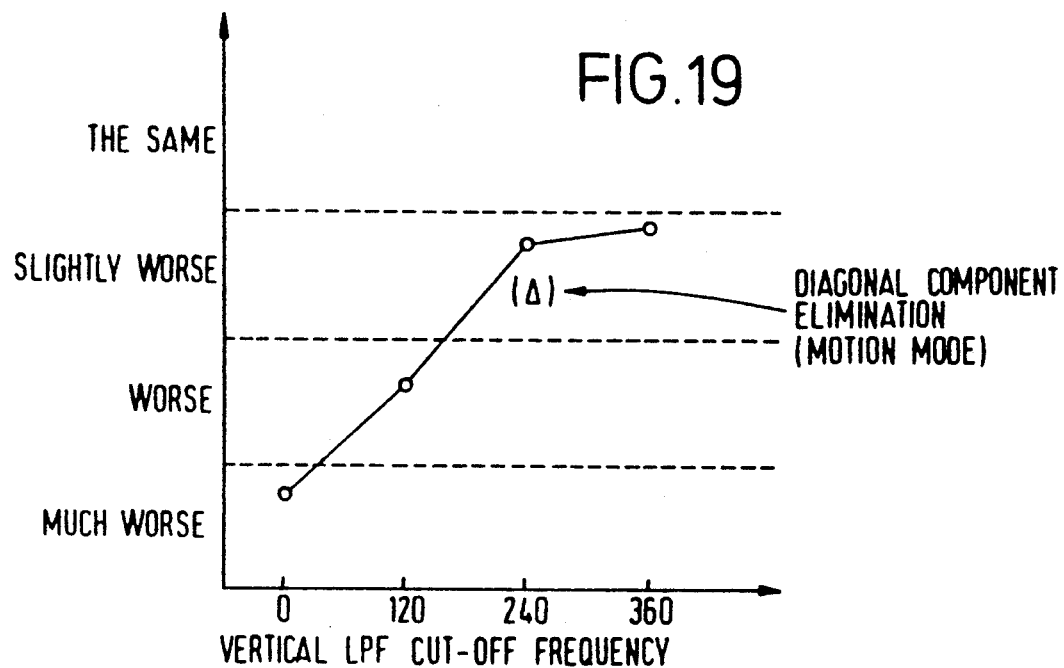
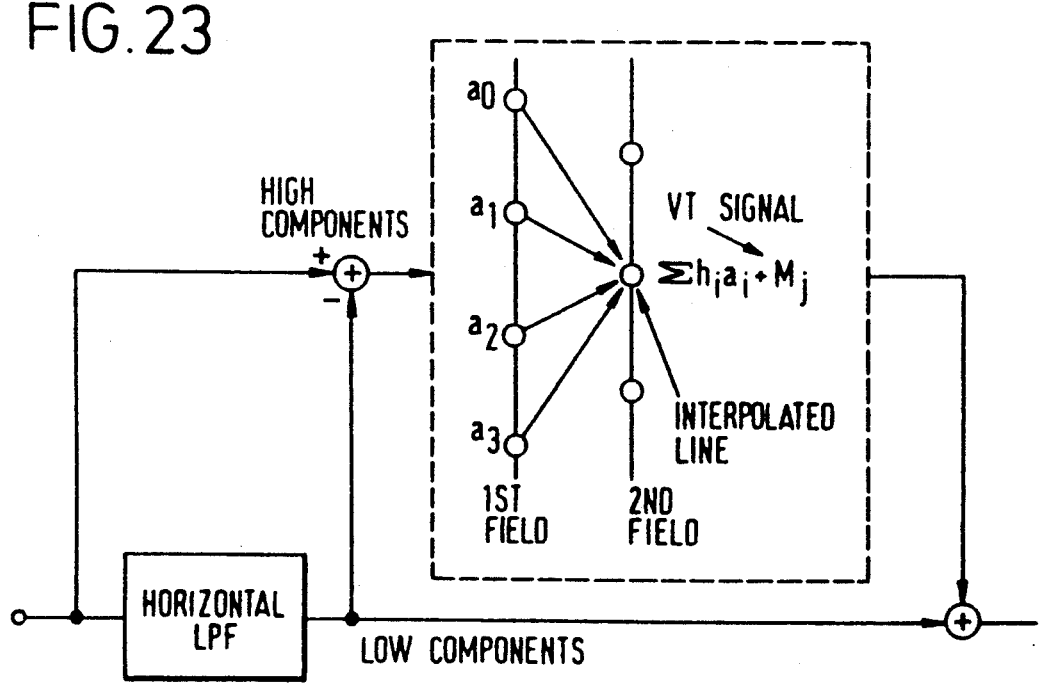

COMPATIBLE TELEVISION SYSTEM WITH COMPANDING AUXILIARY SIGNAL

FIELD OF THE INVENTION

The present invention relates generally to a television system, and more particularly to a compatible television system with companding auxiliary signal.

BACKGROUND OF THE INVENTION

A conventional television receiver, such as a receiver in accordance with NTSC broadcast standards adopted in the United States, Japan and elsewhere, has a 4:3 aspect ratio (the ratio of the width to the height of a displayed image).

Recently, there has been interest in using higher aspect ratios of television receiver systems, such as 2:1, 16:9, or 5:3, since such higher aspect ratios more nearly approximate or equal the aspect ratio of the human eye than does the 4:3 aspect ratio of a conventional television receiver. There has been also interest in using scan conversion of television systems.

Video information signals with a 5:3 aspect ratio have received particular attention since this ratio approximates that of motion picture film, and thus such signals can be transmitted and received without cropping the image information. However, wide aspect television systems which simply transmit signals having an increased aspect ratio as compared to conventional systems are incompatible with conventional aspect ratio receivers. This makes widespread adoption of wide aspect television systems difficult.

It is therefore desirable to have a wide aspect television system which is compatible with conventional television receivers. One such system is disclosed in the U.S. Pat. No. 4,855,824 of J. S. Fuhrer.

FIG. 1 shows again the compatible wide aspect television system disclosed in the U.S. Pat. No. 4,855,824. In FIG. 1, 1201 is an original wide aspect progressive-scan signal with the aspect ratio 16:9 or 5:3. This signal 1201 is comprised of left, right and center panel information and processed so as to develop four separate encoding components 1202, 1205, 1209 and 1210.

The first component 1202 contains time expanded center panel information and time compressed side panel information of low frequency. The second component 1205 contains time expanded side panel information of high frequency. The third component 1209 contains high frequency luminance information. The fourth component 1210 contains vertical temporal helper information of high frequency.

The center panel information in the first component 1202 does not cause a pattern distortion when decoded on a standard television receiver because it has been time expanded. Further, the side panel information of the first component 1202 is multiplexed to the horizontal over-scan regions where such information is hidden from view in a standard television receiver image display.

The side panel information in the second component 1205 is time expanded four times. Therefore, the band of the second component 1205 is compressed to ¼. As will be described later, the present invention is intended to improve the first and second components 1202 and 1205.

The second component 1205 is processed in an intra-frame averager circuit 1206. A resulting intra-frame average signal output from the intra-frame averager circuit 1206 is converted into a progressive scan format signal. This output is quadrature modulated (frequency shift modulated) with the third component 1209, which has been inter-frame averaged, by a quadrature modulator 1207.

The main signal, i.e., the first component 1202 is also intra-frame averaged in an intra-frame averager circuit 1203. This main signal 1202 is added to a carrier signal from the quadrature modulator 1207 by the adder 1204 and the added output becomes a transmission signal via the quadrature modulator 1208. The reason for summing of the main signal 1202 in the frames is to facilitate separation of the main signal 1202 from the side panel high-pass signal 1205 at the receiving side. Further, the quadrature modulator 1207 reverses carrier phase between lines.

FIG. 2 is a diagram for illustrating the process of intra-frame averaging in the context of the system of FIG. 1. Starting with the block 1301, pairs of pixels 262H apart within a frame, i.e., pixels in different fields of the same field of the first component 1202, are averaged. For example, a pair of original pixels Y1+C1 and Y2+C2 are averaged. The average value, e.g., M1 ($M1 = [(Y1+C1)+(Y2+C2)]/2$) replaces each of the original pixel values. Thus, the pixels in the different fields of the averaged frame, e.g., 1303 have the same value.

The averaged values X1, X3 in the frame 1304 are quadrature modulated in the quadrature modulator 1305 (equivalent to the quadrature modulator 1208 shown in FIG. 2). Thus, the modulated signals in adjacent lines of the same frame 1306 become opposite in phase, as shown by $-A1$ and $A1$. The signal 1306 is added to the signal 1303 in the adder 1308. A resulting output signal 1307 becomes $M1-A1$ in the first field and $M1+A1$ in the second field.

In a television receiver, the main signal M can be restored by summing the signals in the different fields, while the side panel high-pass component A can be restored by subtracting them.

Next, the construction of the encoder which performs the multiplex signal processing described above and that of the decoder which perform the restoration are explained referring to FIGS. 3 and 4.

FIG. 3 shows the construction of the encoder and 1405 is a terminal to which the main signal 1202 is led. From the signal from the terminal 1405, a signal in the area to which auxiliary signal (the side band high-pass component) is multiplexed by the band-pass filter (BPF) 1406 is extracted. The inter-field sum of this signal in the multiplex area is performed by the intra-frame averager circuit composed of the field delay unit 1408 and the adder 1409. The inter-field sum output from the adder 1409 is progressively scanned by the selector 1412. The output of the selector 1412 is added to a signal outside the multiplex area from the one field delay unit 1411. The signal outside the multiplex area is a signal from the adder 1407 which adds the main signal 1201 to a signal passed through the band-pass filter 1406.

Another input terminal 1401 receives the time expanded side panel high-pass component signal 1205. The inter-field summing of the signal from the terminal 1401 is carried out by the field delay unit 1416 and the adder 1417. The inter-field summed output from the adder 1417 is converted into a progressive-scan format by the field delay unit 1418 and the selector 1419. The progressive-scan format signal is frequency shifted to the multiplex area through the modulator 1420. The phase of the signal shifted to the multiplex area is reversed for every line by the phase reversing circuit 1403 and the selector 1404. This phase reversed output from the selector 1404 is input to the adder 1414 where it is added to the main signal with the side panel signal from the adder 1413 added. The phase reversed output from the selector 1404 is a signal equivalent to the frame signal 1303 shown in FIG. 2.

The auxiliary signal multiplexed output from the adder 1414 is obtained at the output terminal 1415.

FIG. 4 shows the construction of the decoder. The auxiliary signal multiplexed output from the output terminal 1415 is fed to the terminal 1501. The signal from the multiplex area is extracted at the terminal 1501 by the band-pass filter 1502. The inter-field difference and sum calculations are carried out for the signal from the band-pass filter by the field delay unit 1505 and the adders 1506 and 1507. The difference signal encoded from the adder 1506 is the side panel high-pass component of with its phase reversed between the fields.

This signal is demodulated by the demodulator 1508. Thus, the restored output of the side panel high-pass component is obtained at the output terminal 1512. The summed signal output from the adder 1507 is the multiplex area signal of the main signal with the side panel high-pass component removed. This signal is input into the adder 1511 after being processed by the field delay unit 1509 and the selector 1510 and added to the signal outside the multiplex area from the field delay unit 1504. As a result, the main signal with the side panel low-pass component superposed on the horizontal over-scanning area is obtained at the output terminal 1513. Further, the main signal outside the multiplex area is output by the adder 1503 which adds up the output of the band-pass filter 1502 and the signal from the terminal 1501.

According to the system, it is possible to perform the multiplex transmission of auxiliary signals by performing inter-field summing and processing. However, multiplex transmission of auxiliary signals according to this system deteriorates a smooth oblique line into a zigzag line on the image display by the vertical aliasing distortion as shown in FIG. 5.

The phenomenon on the edge is produced because the first field signal is also used in the second field. It is seen that on the encoder shown in FIG. 3, the edge part is made obscure through the inter-field summing by the field delay unit 1408 and the adder 1409 but it cannot be thoroughly improved. Even when a pre-filter (vertical LPF) having a steep frequency characteristic is used instead of the inter-field summing, the zigzag deterioration is caused in accordance with the progressive-scan format conversion.

FIGS. 6(a) through 6(d) illustrate the phenomenon produced at the edge in terms of spectrum. In FIGS. 6(a) through 6(d), the ordinate represents the number of vertical scanning lines and the abscissa represents gains. When the vertical band is limited to 240 lines in advance by a vertical pre-filter, vertical spectra are expressed as shown in FIG. 6(a). The signal having this spectrum produces the folded component as shown in FIG. 6(b) (the output from the adder 1409). If the progressive-scan format conversion is carried out for such a signal at the receiving side, the result would become the same when a vertical interpolating filter shown in FIG. 6(c) was used and the signal obtained from the terminal 1512 or 1513 presents the spectrum shown in FIG. 6(d). In the drawing, the oblique lined section 9001 is left as the folded component, causing notches.

As described above, the system disclosed in the U.S. Patent of J. A. Fuhrer, which performs the inter-field summing and the progressive-scan format conversion had the defect that the zigzag deterioration is caused on the obliques by the aliasing distortion.

Further, conventional scan conversion systems has performed the inter-field summing and the progressive-scan format conversion so that they had the defect of causing the zigzag deterioration on the obliques by the aliasing distortion.

SUMMARY OF THE INVENTION

It is, therefore, an object of the present invention to provide a compatible television system with companding of auxiliary signal which is able to prevent a deterioration of the picture caused by multiplexing auxiliary information on the television signal.

In order to achieve the above object, a compatible television signal encoder according to one aspect of the present invention includes a divider for dividing the wide aspect television signal into a main signal having the first signal and low-frequency components of the second signal multiplexed in the horizontal overscan regions of the first signal and an auxiliary signal, an interpolator for producing an interpolating scanning field signal using a first scanning field signal of the main signal output from the divider, a field switch for replacing a second scanning field signal of the main signal with the interpolating scanning field signal output from the interpolator and an adder for adding the auxiliary signal from the divider to the signal output from the field switch.

A compatible television signal decoder according to another aspect of the present invention includes an interpolator for producing a compensating field signal using the first scanning field signal of the television signal, a first adder for separating the auxiliary signal by subtracting the compensating field signal output from the interpolator from the second field signal output from the television signal, a frequency demodulator for shifting the auxiliary signal to the original frequency and a second adder for adding the second scanning field signal of the television signal and the compensating field signal output from the interpolator.

Other objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 19 through 22 are graphs showing the result of the subjective test;

FIG. 23 is a explanatory diagram showing the principle of the multiplexing process;

DESCRIPTION OF THE PREFERRED EMBODIMENTS

Figure 1:
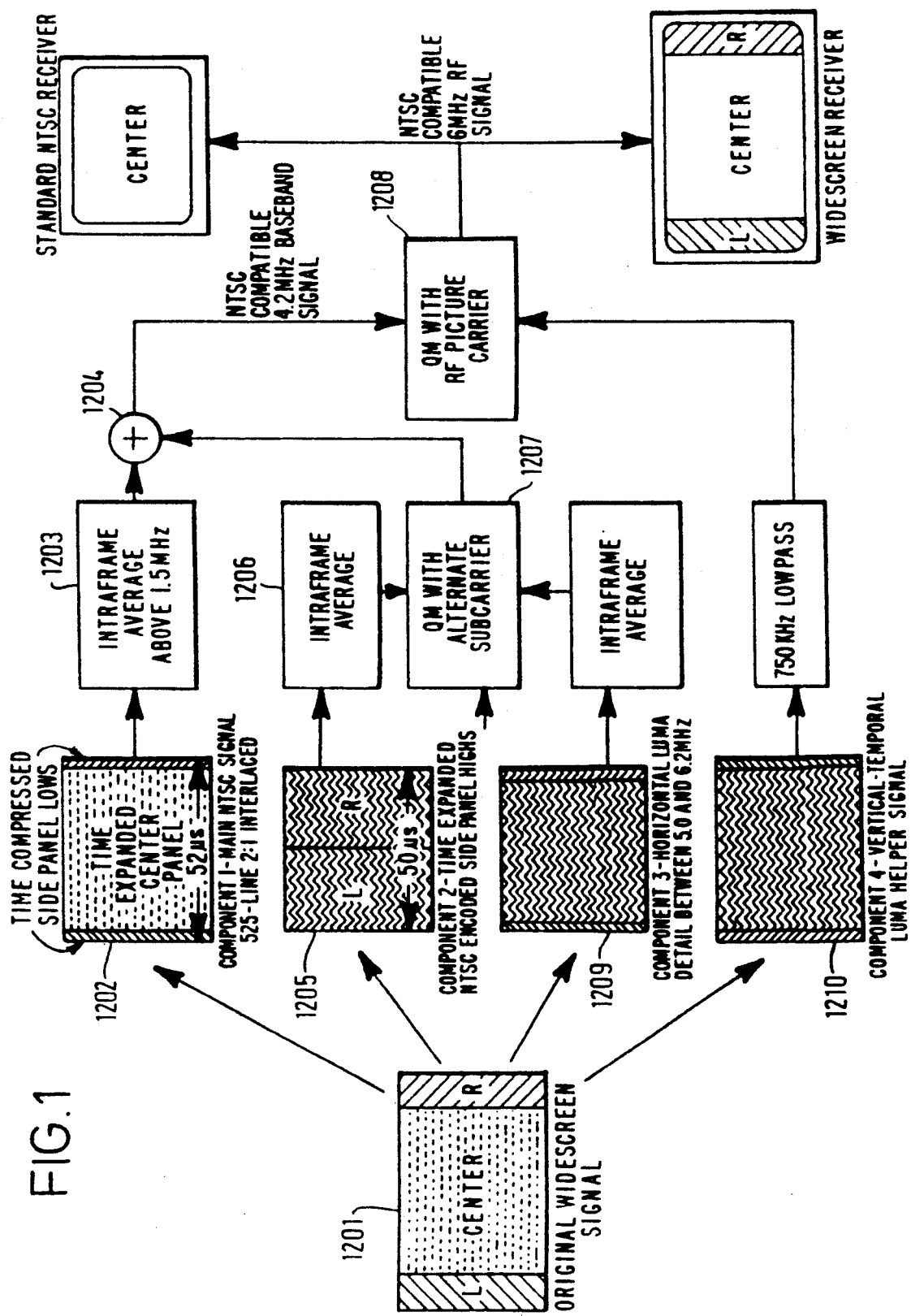
FIG. 1 is an explanatory diagram explaining the side picture signal multiplexing method.
Figure 2:
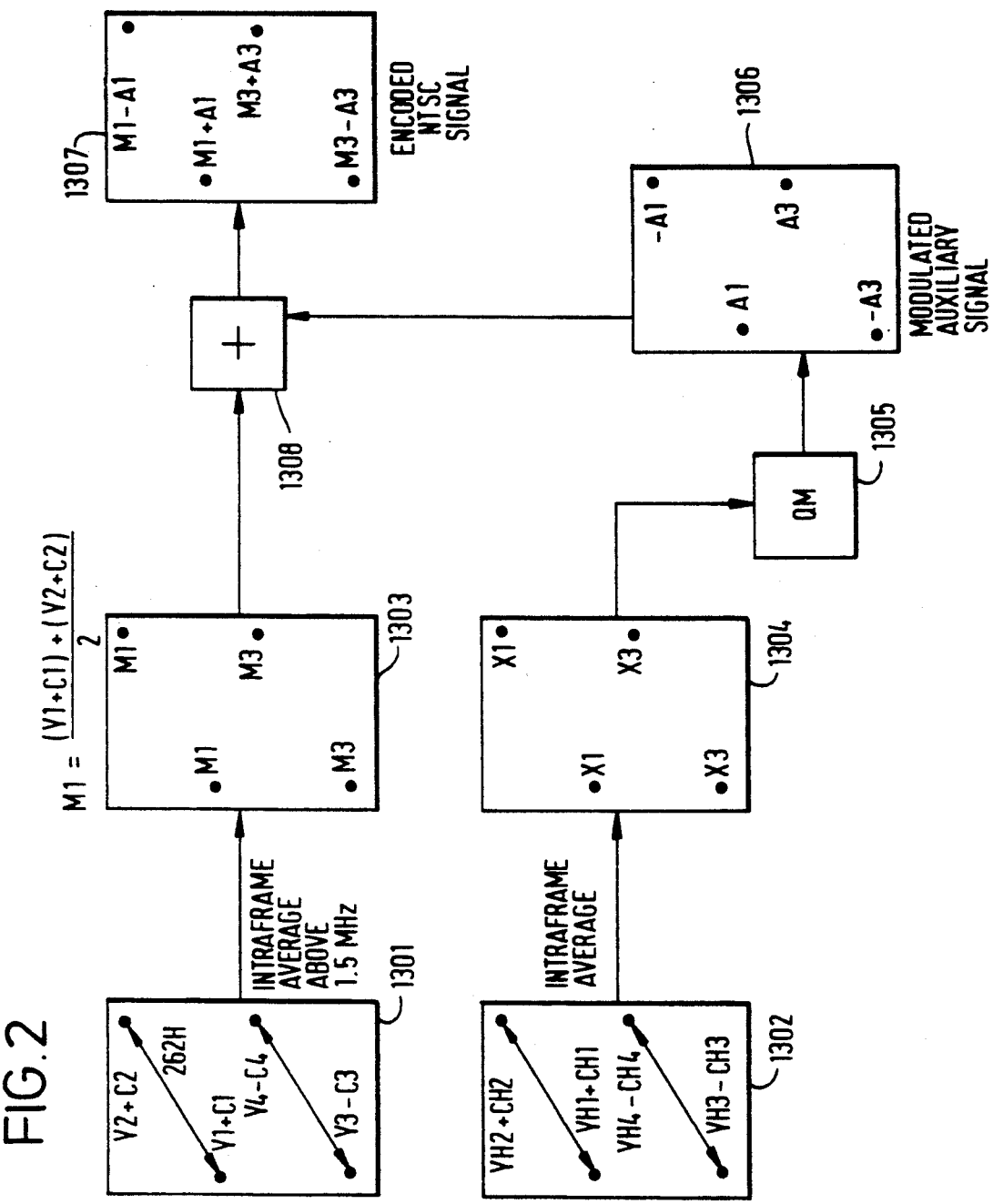
FIG. 2 is an explanatory diagram explaining the conventional multiplex processing.
Figure 3:
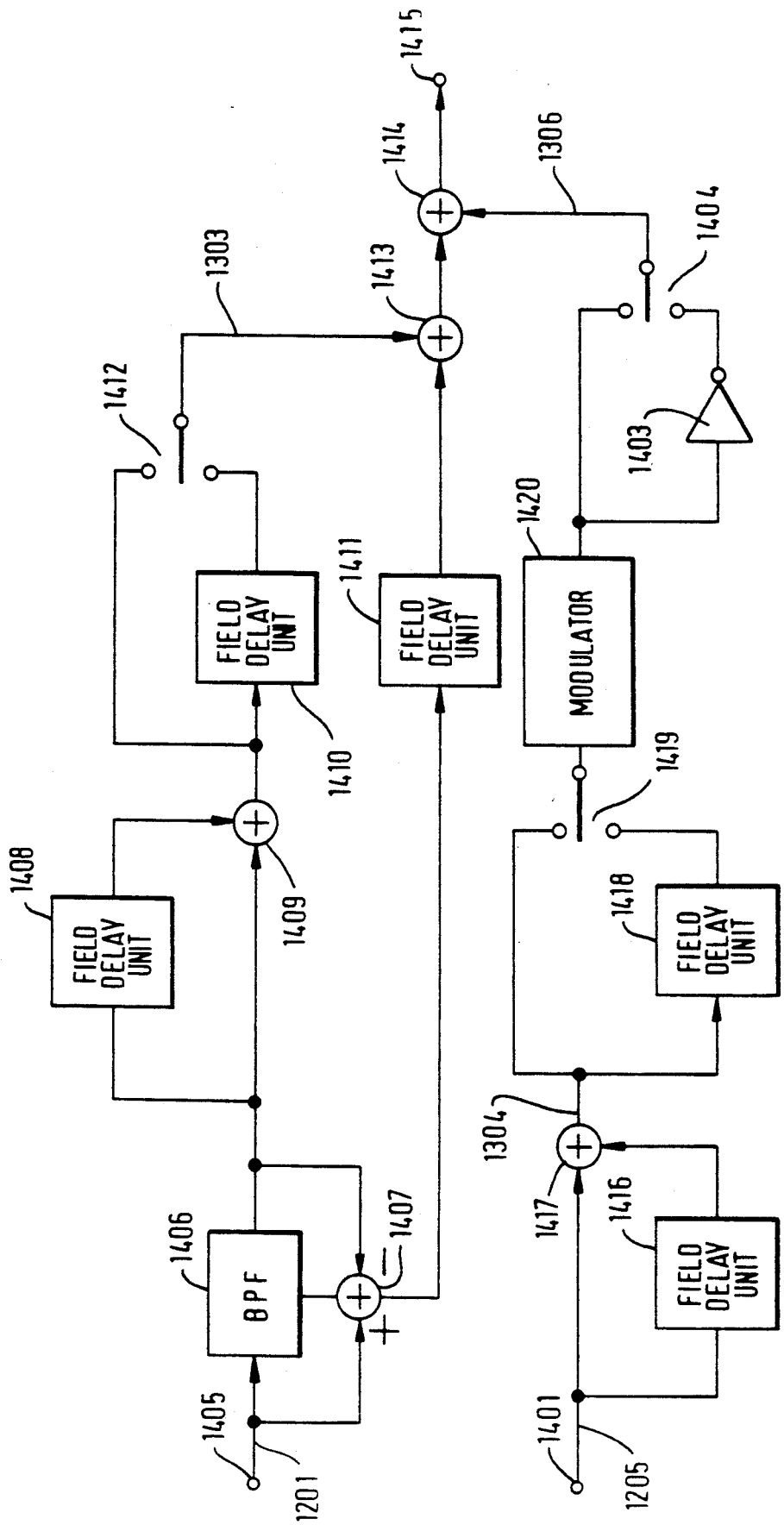
FIGS. 3 and 4 are block diagrams showing the conventional auxiliary signal multiplexed television signal encoder and decoder, respectively.
Figure 4:
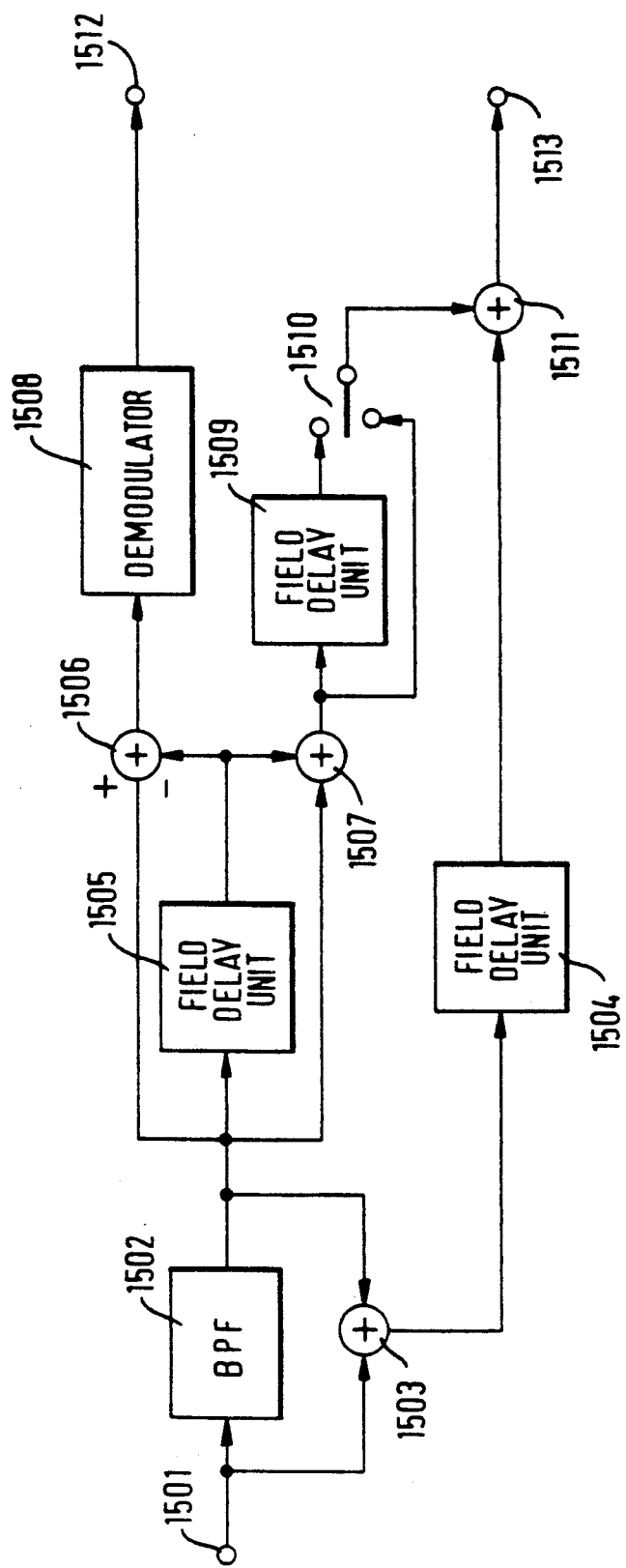
Figure 5:
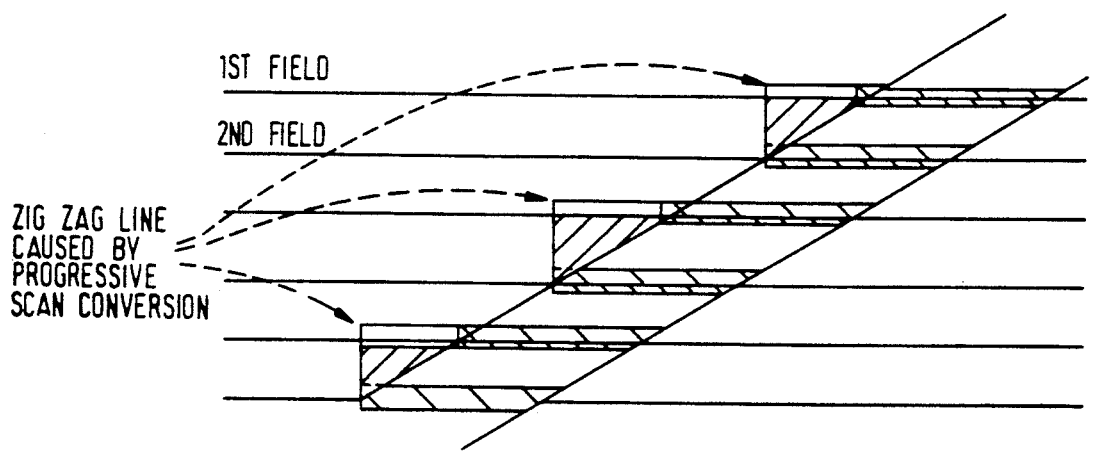
FIG. 5 is an explanatory diagram showing the status of the image display according to the conventional multiplexing method.

The present invention will be described in detail with reference to the FIGS. 7 through 27. Throughout the drawings, reference numerals or letters used in FIGS. 1 through 6 will be used to designate like or equivalent elements for simplicity of explanation.

Figure 7:
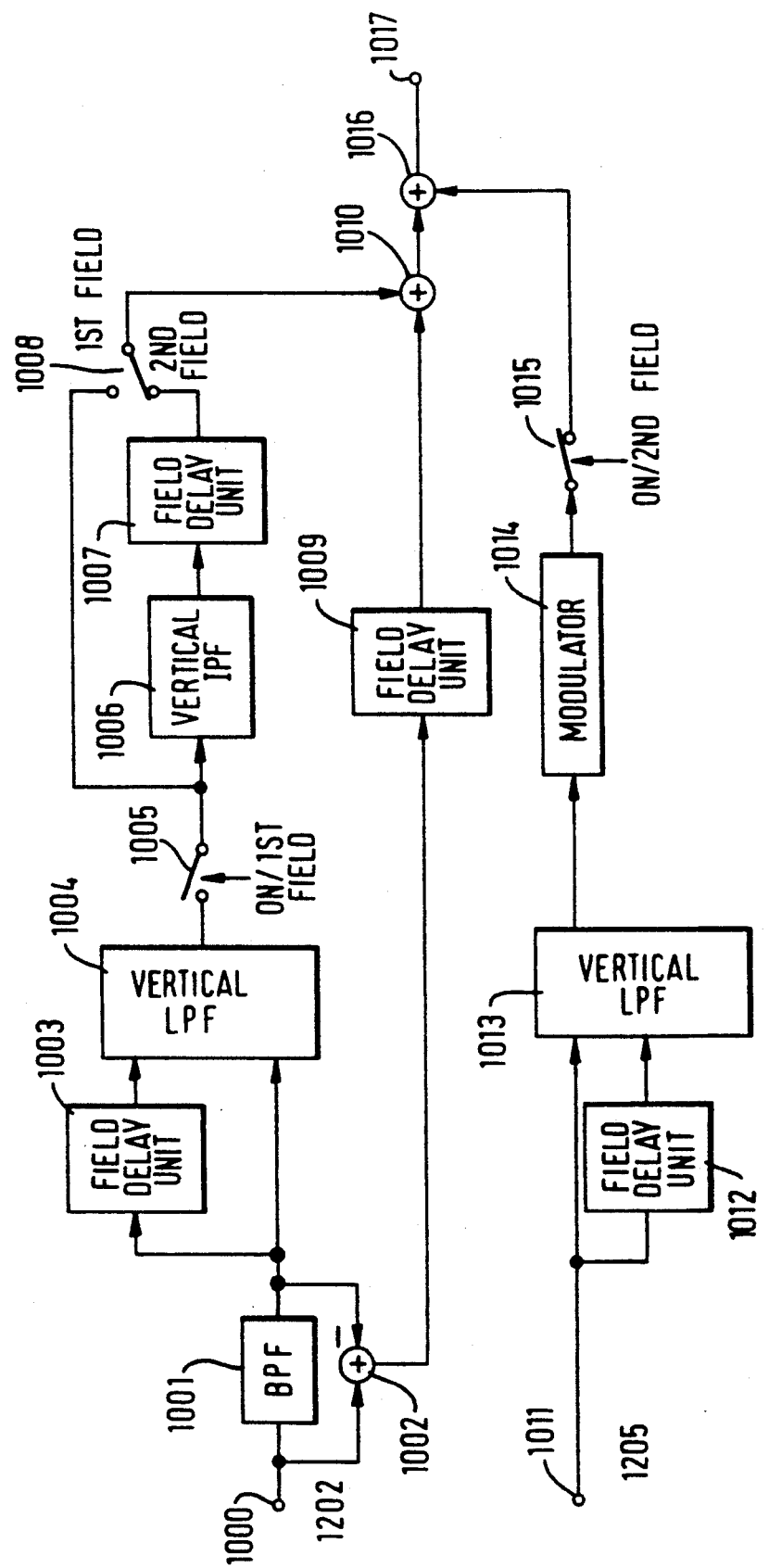
FIGS. 7 and 8 are block diagrams showing the auxiliary signal multiplexed signal encoder and decoder involved in the present invention.
Figure 8:
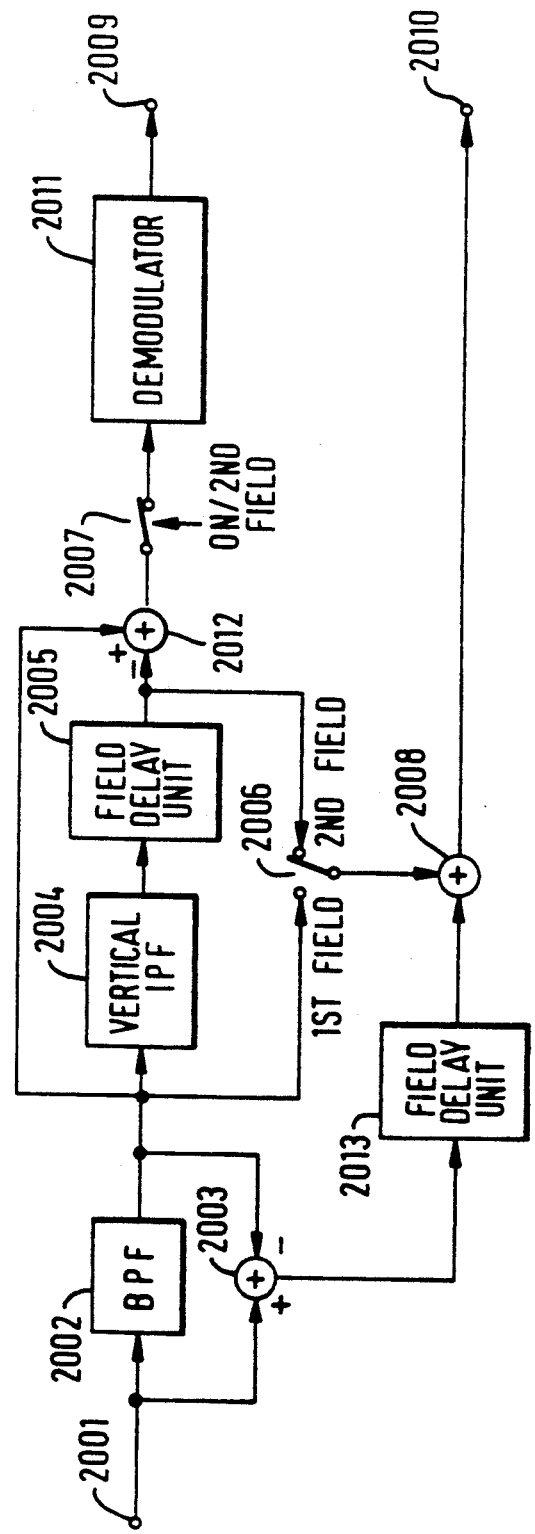

Referring now to FIGS. 7 and 8, a first embodiment of the auxiliary signal multiplexed television system according to the present invention will be described in detail.

FIG. 7 is a block diagram showing an embodiment of the auxiliary signal multiplexed television signal encoder involved in the present invention.

In FIG. 7, the main signal 1202 (see FIG. 2) with the low-pass component of the side panel information which was time compressed and multiplexed in the horizontal over-scanning area is led to the terminal 1000. The signal from terminal 1000 is input to a pre-filter (a temporal vertical LPF processing block) composed of the field delay unit 1003 and the vertical LPF 1004 through the band-pass filter (BPF) 1001 which allows a signal of an area to which the auxiliary signal (the side band high-pass component) is multiplexed to pass. This pre-filter limits the vertical band of the signal from the band-pass filter 1001 to 240 lines. The signal of the first field only is selected by the switch 1005 for the output from the vertical LPF 1004.

Signals from the switch 1005 are divided into signals to be induced into the vertical interpolating filter (IPF) 1006 and signals to be induced into the first input terminal of the selector 1008. The signal induced into the vertical interpolating filter 1006 is led to the second input terminal of the selector 1008 through the field delay unit 1007. The selector 1008 selects the second field signal produced through interpolation from the field delay unit 1007 after selecting the first field signal induced into the first input terminal. The output signal from the selector 1008 is input into the adder 1010 and added to the main signal outside the multiplex area from the field delay unit 1009. The main signal outside the multiplex area is the signal from the adder 1002 which adds the main signal 1202 and the signal passed through the band-pass filter 1001.

1011 is the terminal to which the signal of the time expanded side panel high-pass component 1205 is provided. The vertical band of the signal from the terminal 1011 is limited to 240 lines by a pre-filter composed of the field delay unit 1012 and the vertical LPF 1013. Output from the vertical LPF 1013 is input into the adder 1016 through the modulator 1014 and the switch 1015 connected to the second field and the side panel information of the signal from the adder 1010 is added to the main signal multiplexed to one field. Auxiliary signal multiplexed output composed of the side panel high-pass signal 1205 and the main signal 1202 is led to the output terminal 1017.

An embodiment of the auxiliary signal multiplexed television signal decoder involved in the present invention is shown in FIG. 8.

In FIG. 8, the auxiliary signal multiplexed output from the sending side output terminal 1017 is led to the terminal 2001. The signal from the band-pass filter 2002 is divided into three parts which are induced into the vertical interpolating filter 2004, the first input terminal of the adder 2012, and the first input terminal of the selector 2006, respectively. The signal input into the vertical interpolating filter 2004 is led to the second input terminals of the adder 2012 and the selector 2006 through the field delay unit 2005. Here, the vertical interpolating filter 2004 interpolates the second field signal from the first field signal and loads the secondary field signal generated through the interpolation into the second input terminal of the adder 2012, and adds the second field signal led to the first input terminal of the adder 2012 and the second field signal generated through the interpolation.

Thus, the auxiliary signal is separated from the second field signal with the auxiliary signal multiplexed at the sending side. The auxiliary signal from the adder 2012 is led to the output terminal 2009 through the switch 2007 which is conducted during the second field period and the demodulator 2011.

On the other hand, the selector 2006 provides the signal from the band-pass filter 2002 in the first field to the adder 2008 as well as the signal in the multiplex area from the delay unit 2005, which is obtained through the interpolation by the vertical interpolating filter 2004 and the signal outside the multiplex area in the second field. These are added to the signal from the delay unit 2013. As a result, the main signal is separated from the adder 2008 and led to the output terminal 2010.

The operations described above are explained below referring to FIGS. 9 through 11.

FIG. 9 shows spectra at operating points and filter characteristics of the encoder shown in FIG. 7. On the encoder shown in FIG. 7, the spectrum characteristic of the signal from the vertical LPF 1004 is as shown in FIG. 9(a) because components of more than 240 lines are eliminated. Next, the signal from the vertical LPF 1004 produces the folded component 3003 as shown in FIG. 9(b) because the number of scanning lines is reduced to the half by the switch 1005. This signal has spectrum with less folded component 3002 as shown in FIG. 9(d) by the field interpolating characteristic of the vertical interpolating filter 1006 shown in FIG. 9(c). This is clearly seen when compared with the folded spectrum 9001 shown in FIG. 6.

Figure 10:
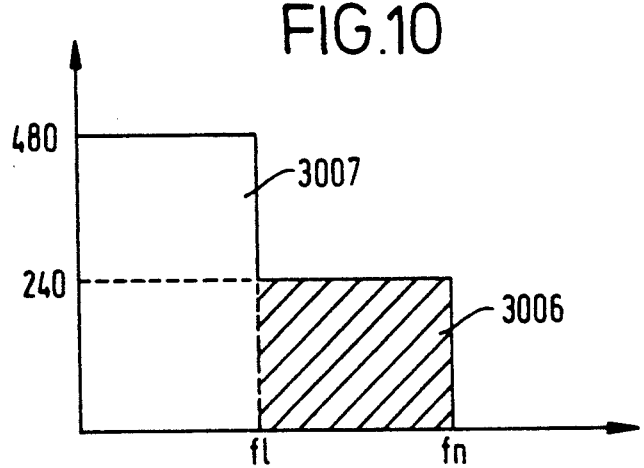

Because the processings described above are performed for the multiplex area components which are output from the band-pass filter 1001, in the horizontal-vertical frequency areas, the spectrum will become as shown in FIG. 10 (The oblique lined part). Here, fl and fn in FIG. 10 show upper and lower cut-off frequencies of the band-pass filter 101, respectively. Therefore, the auxiliary signal multiplexed output led out of the output terminal 1017 has the spectra 3006 and 3007 shown in FIG. 10 and becomes a good signal in which the oblique high-frequency band having only visually low contribution is partially eliminated.

Figure 11:
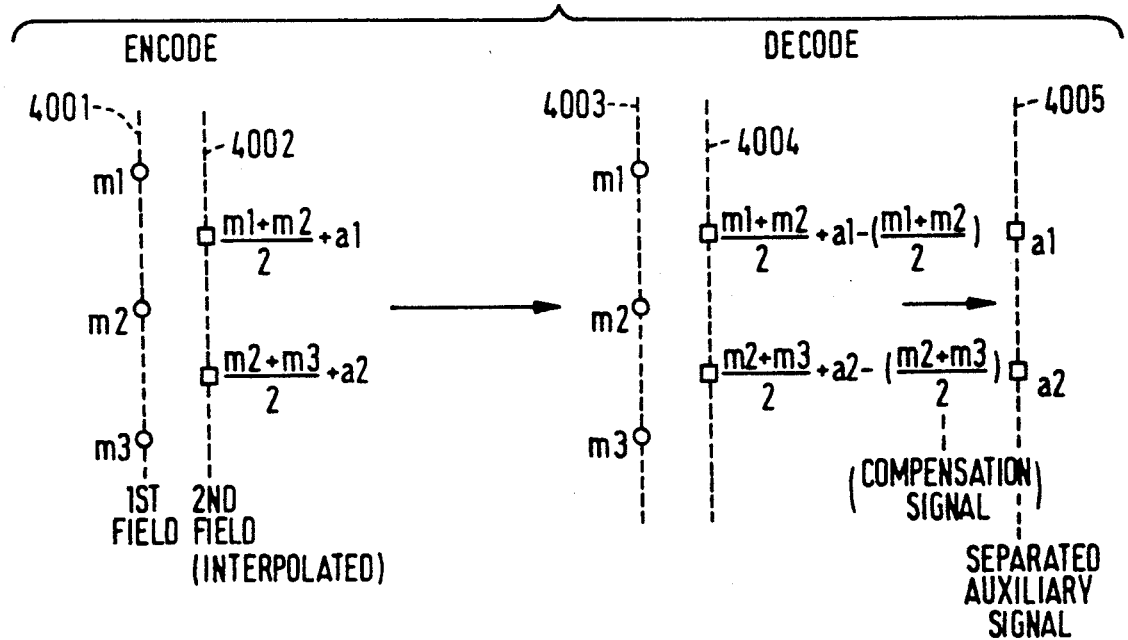

The operation described above are explained in a time area referring to FIG. 11. In FIG. 11, the second field scanning lines shown by 4002 are interpolated by the first field scanning lines m1, m2 and so on shown by 4001. For instance, in case of the interpolation by the upper and lower sum, the second field scanning lines will be expressed by;

$(m1+m2)/2, (m2+m3)/2, \ldots$

Therefore, if auxiliary signals are multiplexed to the above second field, the auxiliary signal multiplexed signals can be expressed by;

$(m1+m2)/2+a1, (m2+m3)/2+a2, \ldots$

At the receiving side, the auxiliary signal multiplexed signals will become as follows as shown by 4004 because differences of the second field are taken after interpolation using the first field scanning lines m1, m2, ..., shown by 4003 in FIG. 11;

$(m1 + m2)/2 + a1 - (m1 + m2)/2,$
$(m2 + m3)/2 + a2 - (m2 + m3)/2,$
$\ldots$
$\ldots$ So, auxiliary signals a1, a2 ... only are separated as shown by 4005 and crosstalk does not becomes a problem. Further, in the case of receiving by a standard television receiver, it is possible to prevent occurrence of jammings such as flicker, etc.

Figure 12:
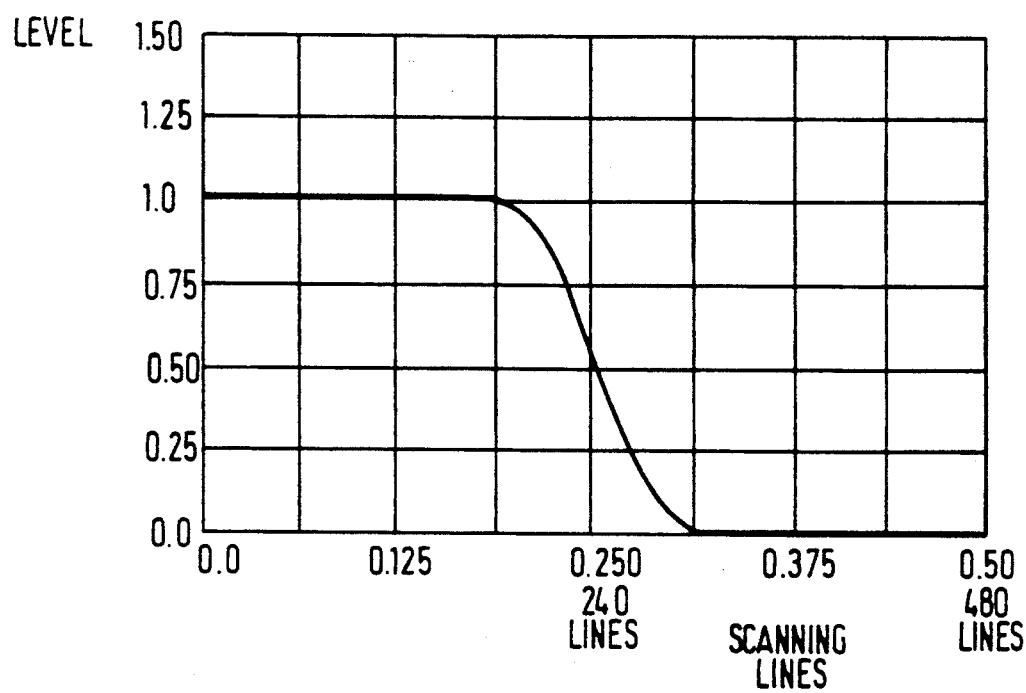
FIG. 12 is an characteristic diagram showing the characteristic of the vertical interpolating filter in the case of upper and lower scanning line interpolation.

FIG. 12 shows the vertical interpolating filter characteristic when the interpolation was made using two lines between the upper and lower scanning lines described above. The abscissa shows the number of scanning lines and the ordinate shows level.

According to the drawing, in the case of interpolation by the sum of upper and lower scanning lines, the number of scanning lines is approximately 180 lines and the interpolation without attenuation is possible.

Figure 13:
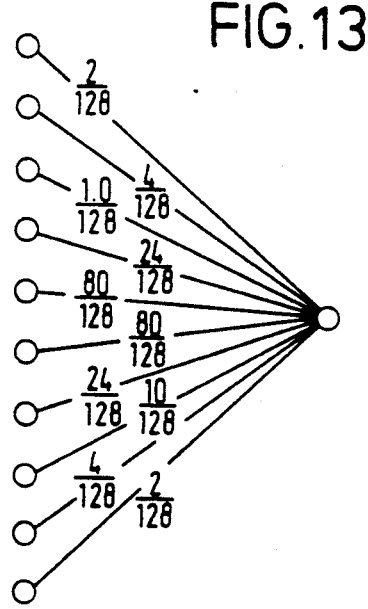
FIG. 13 is an explanatory diagram showing the interpolation by 10 scanning lines.
Figure 6A:
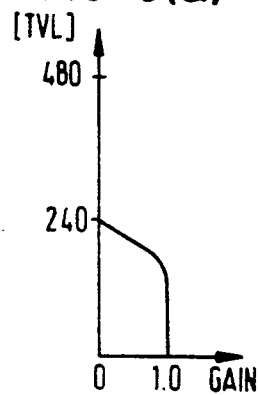
FIGS. 6(a)–6(d) are the spectra and filter characteristics at various operating points of the convention structure.
Figure 6B:
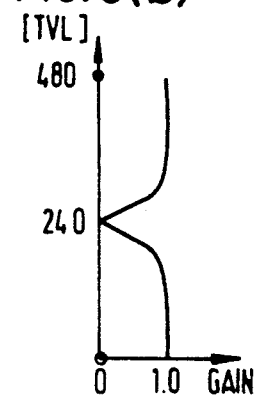
Figure 6C:
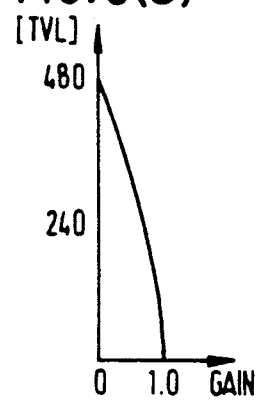
Figure 6D:
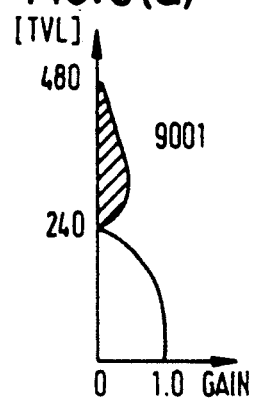
Figure 9A:
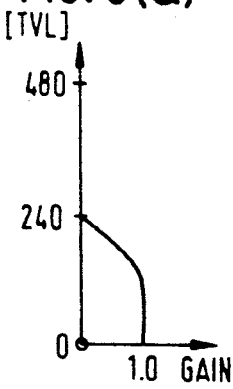
FIGS. 9 through 11 are spectrum and explanatory diagrams for explaining the operations of the present invention.
Figure 9B:
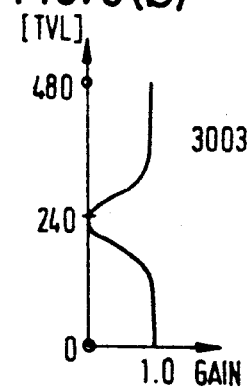
Figure 9C:
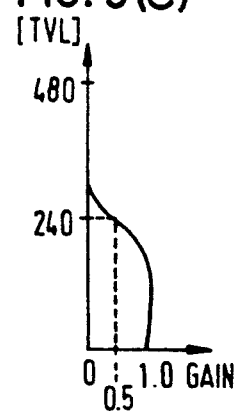
Figure 9D:
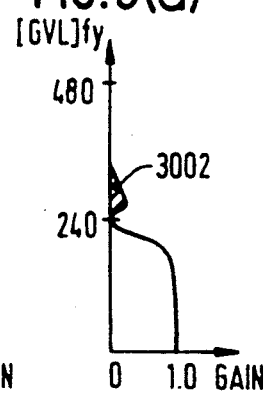
Figure 14:
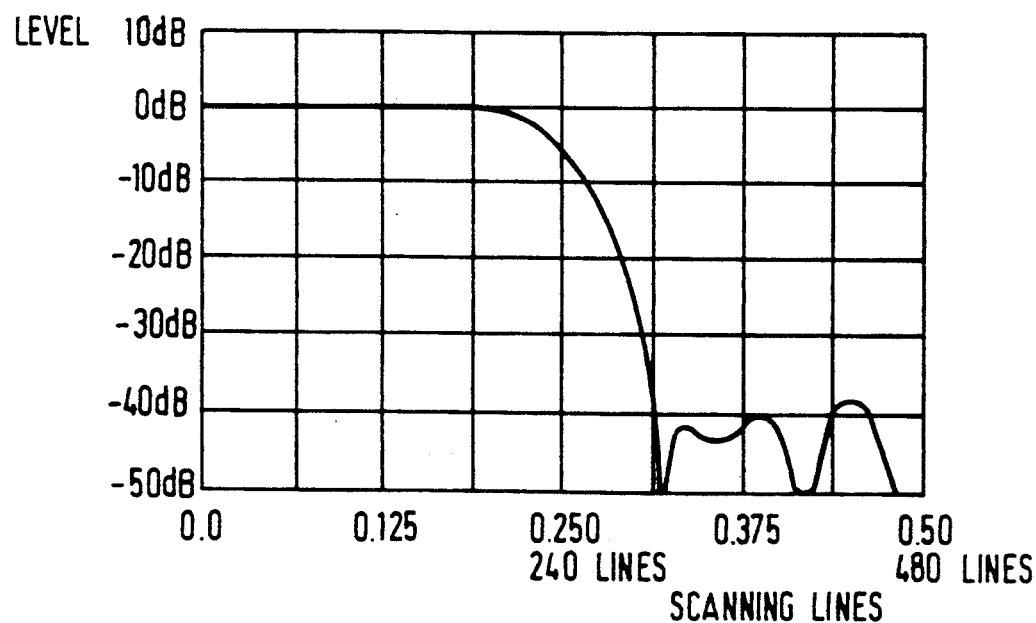
FIG. 14 is the characteristic diagram of the case shown in FIG. 13.

Further, the interpolation may be performed by 10 scanning lines as shown in FIG. 13. FIG. 14 shows the filter characteristic in this case. It can be seen that the number of scanning lines is approximately 240 lines and it is possible to perform the interpolation without causing attenuation.

Figure 15:
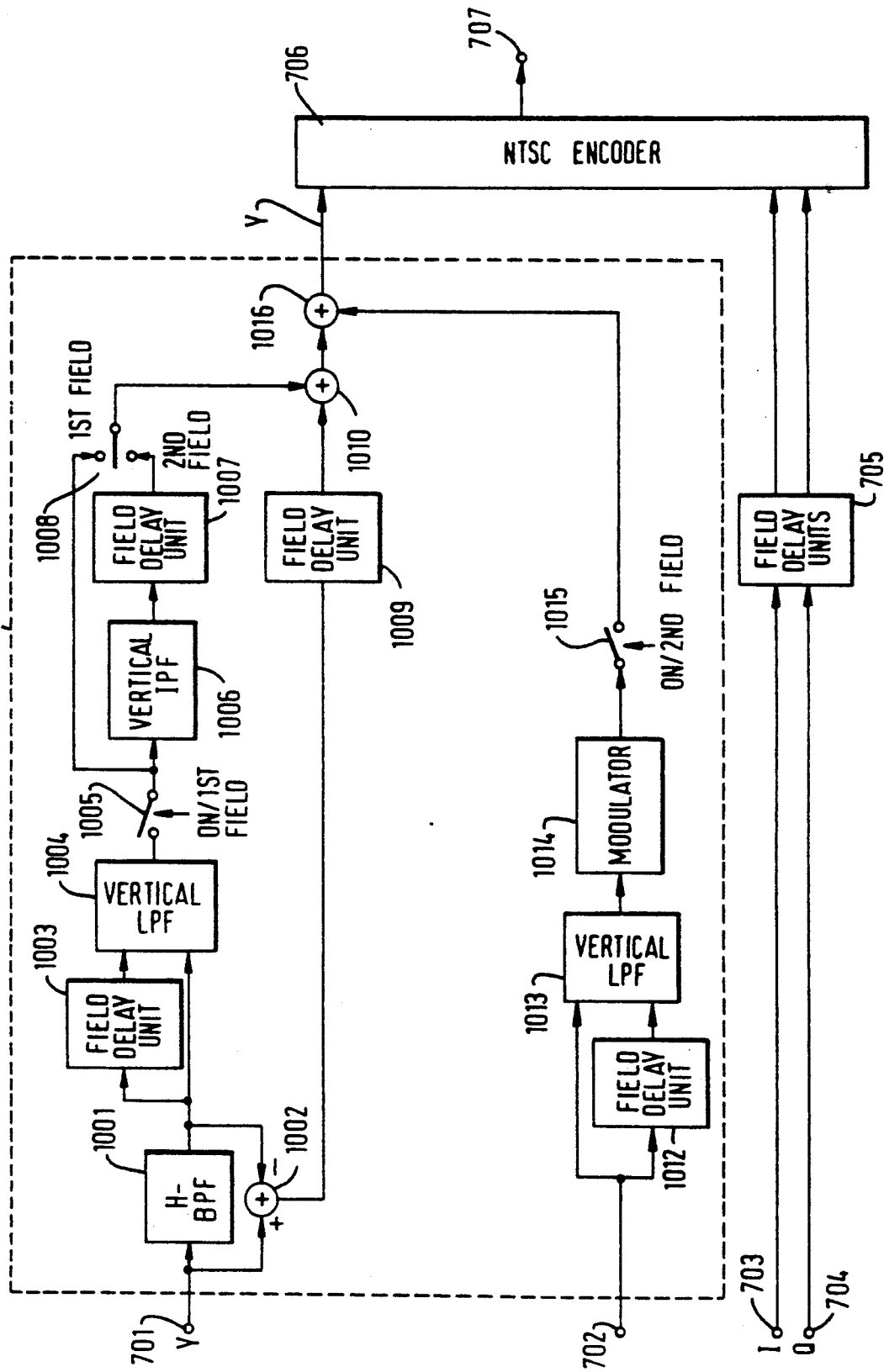
FIGS. 15 and 16 are block diagrams at the sending and receiving sides assuming an actual system.
Figure 16:
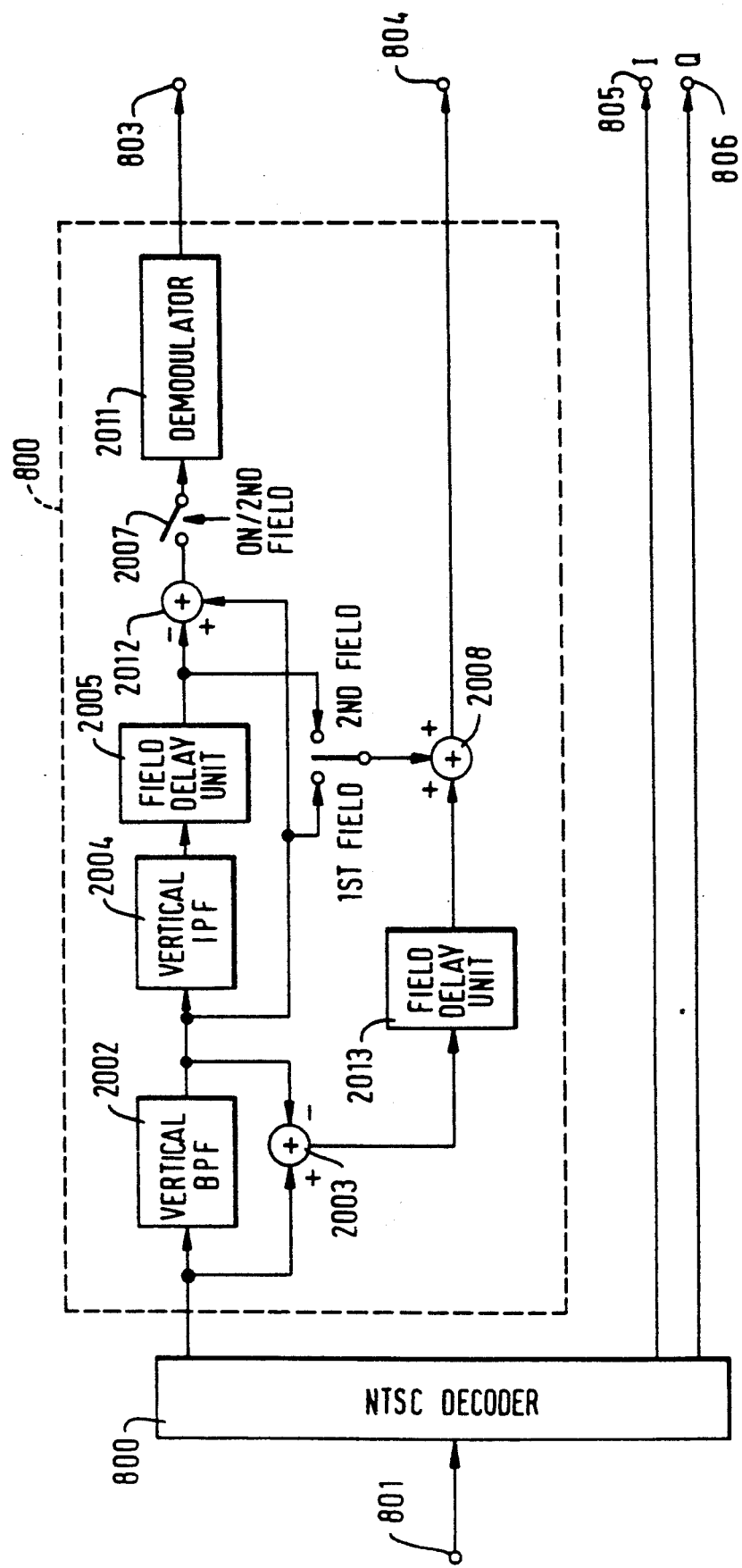

FIGS. 15 and 16 shown an embodiment of the present invention where the present invention has been applied to a system which encodes auxiliary signal multiplexed television signals together with color difference signals.

The block 700 enclosed by a dotted line at the sending side in FIG. 15 is the same as the encoder shown in FIG. 7. Main signal, auxiliary signal and color difference signals I and Q are induced into the input terminals 701, 702, 703 and 704, respectively. The main signal and auxiliary signal are encoded through the processing described above and the encoded and acquired luminance signal is input into the NTSC encoder 706.

Here, the cut-off frequency at the upper side of the band-pass filter 1001 is set at around 2.0 MHz with no color difference signal component multiplexed (crosstalk removed). The color difference signals I and Q are input to the NTSC encoder 706 through the delay circuit 705 and multiplexed to the auxiliary signal multiplexed luminance signal. The outputs from the NTSC encoder 706 are output from the output terminal 707 as composite color television signals.

The block 800 enclosed by a dotted line at the receiving side shown in FIG. 16 is a decoder of the same construction as that shown in FIG. 8. The composite color TV signals from the sending side are led to the terminal 801 and decoded to NTSC color signals by the NTSC decoder 802. The decoded color difference signals are output from the output terminals 805 and 806 as the color difference signals I and Q, respectively. Further the decoder 800 leads auxiliary signal and luminance signal (main signal) Y to the output terminals 803 and 804.

Further, although the interpolation was performed based on the first field scanning lines in the embodiment of the present invention, it is needless to say that the interpolation can be performed by the second field scanning lines. The first and second fields referred to in the claims of the present invention do not mean the first and second fields in a general means but mean that when either one of two fields is called the first field, the other is called the second filed.

According to the construction described above, at the sending side, with respect to horizontal high-pass component, that of the first field only is encoded, that of the second field is deleted and the auxiliary signal is encoded. However, interpolating signal by the vertical interpolating filter (Nyquist roll-off filter) is encoded from the first field to the second field.

At the receiving side, the second field signal is interpolated from the first field using a vertical interpolating filter and auxiliary signal is produced by negating the interpolated signal multiplexed in the second field.

Another embodiment of the present invention takes a form a scan conversion encoder and decoder. This embodiment will be described below.

Figure 17:
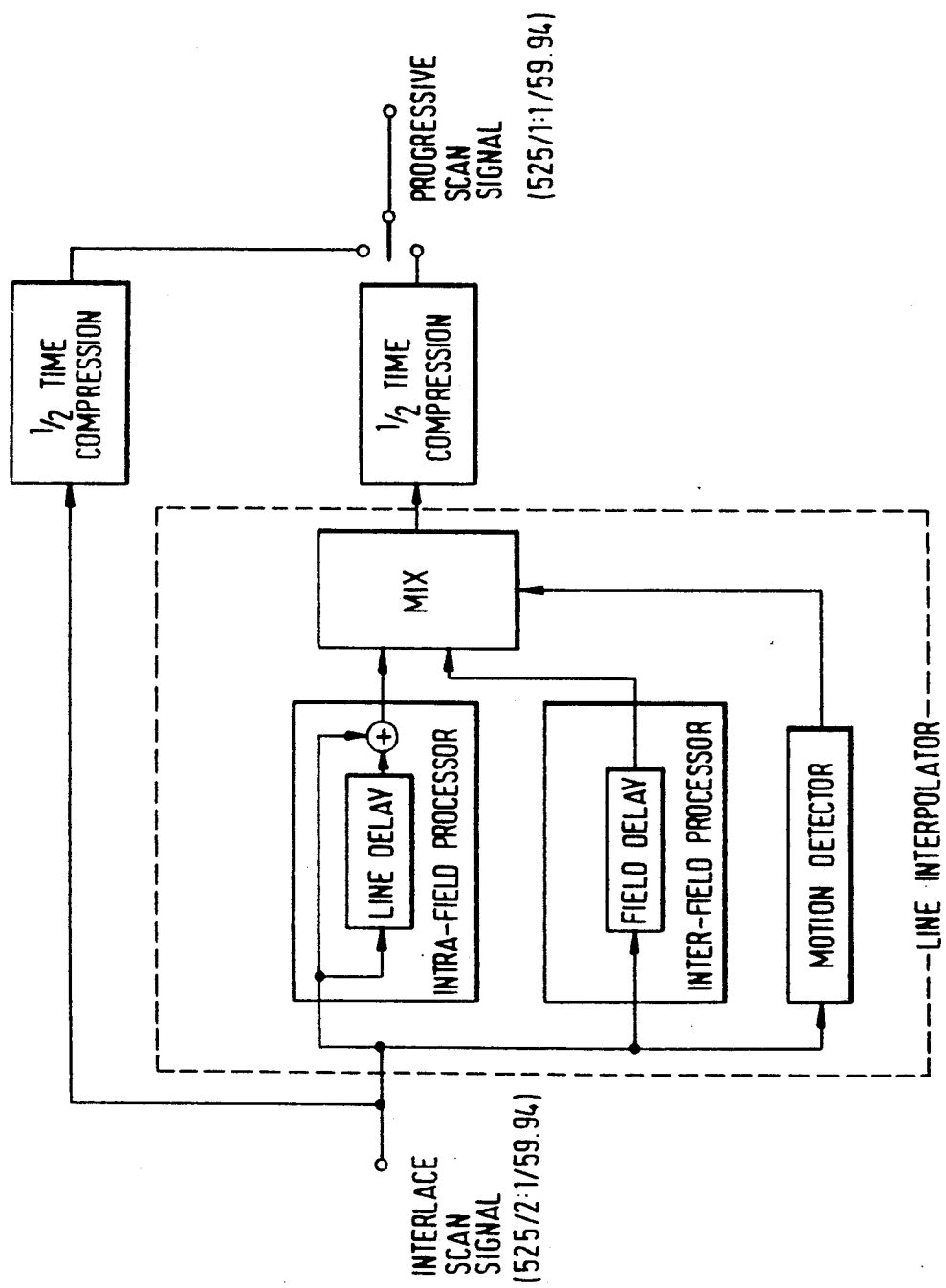
FIG. 17 is a block diagram showing a conventional progressive scan converter.

FIG. 17 shows a conventional progressive scan converter. An interlace scan signal is converted into a progressive scan signal by a motion adaptive scan line interpolator. The scan line interpolator has an intra-field processor, an inter-field processor and a motion detector.

In a stationary picture, the inter-field processor interpolates a scan signal from the preceding field signal. It is a temporal low pass filter. Therefore, vertical resolution is not degraded.

In a motion picture, the intra-field processor interpolates scan line signals from a pair of adjacent the two scan line signals in the same field. Therefore, the interpolated scan line signals of motion picture are produced by vertical low pass filter. It limits vertical resolution up to 240 TVL/PH.

A higher frequency component of the input signal more than 240 TVL/PH causes an aliasing distortion.

The decrease of vertical resolution and the aliasing distortion degrade a motion picture quality.

A progressive scan signal has the advantage of vertical and temporal high resolution. It, however, requires twice bandwidth as much as interlace scan signal. A redundant vertical/temporal spectrum of a progressive scan signal is examined by a subjective test.

Figure 18:
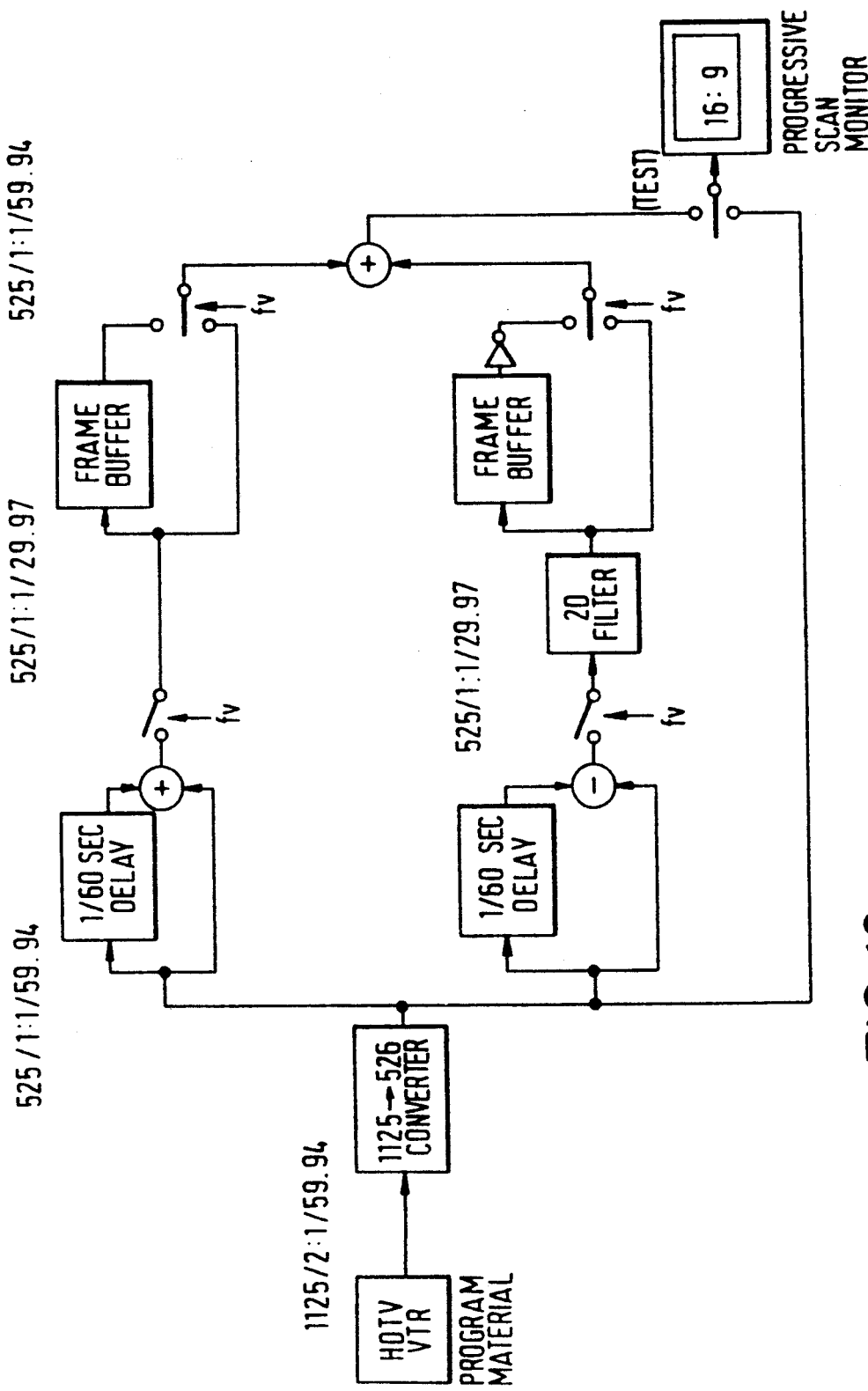
FIG. 18 is a block diagram showing a set-up for a subjective test.

FIG. 19 shows a test set-up for the subjective test. A progressive scan monitor (aspect ratio of 16:9) is used for the test. HDTV (high definition television) program materials are converted to progressive scan signals. The converted progressive scan signal is decomposed to a frame average signal (temporal low frequency component) and a frame difference signal (temporal high frequency component). The frame difference signal is limited up to 2.7 MHz. This band-limited signal causes almost no degradation of motion picture. After then, it is band-limited by a vertical low pass filter. This filer is designated as 2-dimensional filter as shown in FIG. 18. The invertors evaluated the difference between the band-limited picture and the original progressive scan picture.

The result of the subjective test is shown in FIG. 19. It shows the vertical component of the temporal high frequency component of the temporal high frequency component can be band-limited up to 240 TVL/PH without degradation of a motion picture.

Figure 20:
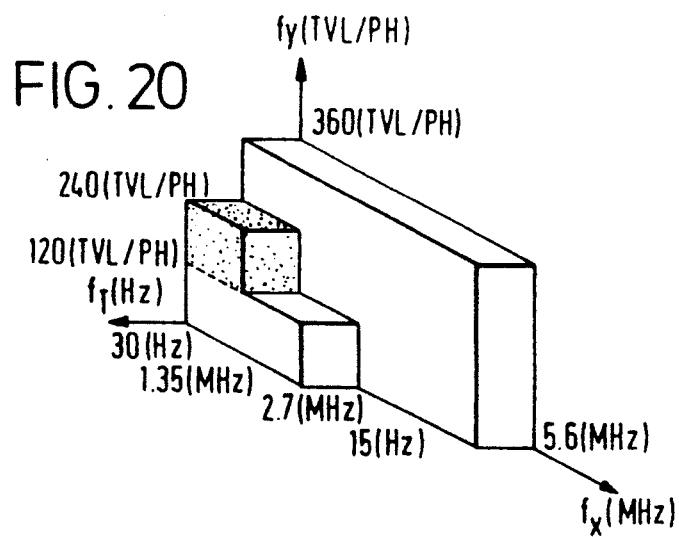

In FIG. 19, a mark Δ presents the result of the spectrum which is eliminated the diagonal high frequency component as shown in FIG. 20. The degradation of the eliminated spectrum is almost negligible.

The band-limited signal as shown in FIG. 20 cannot be directly converted into an interlace scan signal, because the vertical and temporal high frequency component (0–1.35 MHz, 120–240 TVL/PH, 15–30 Hz) is aliased into the low frequency component.

Figure 21:
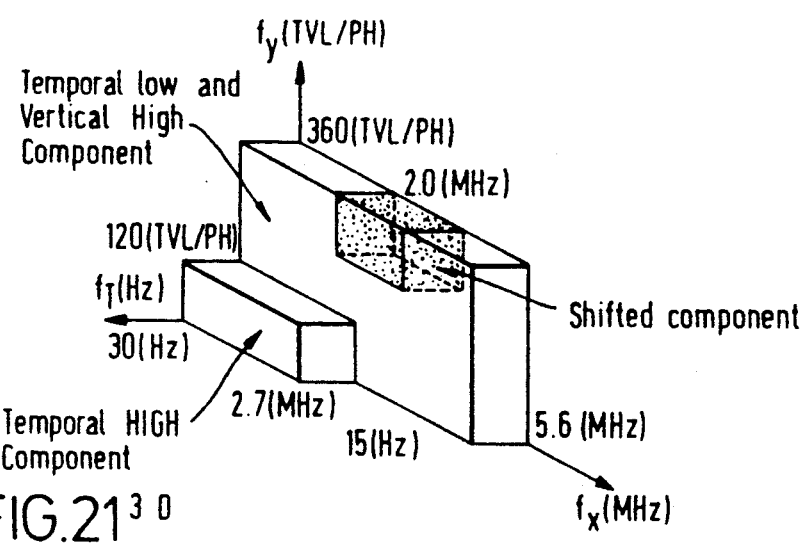

A scan converter according to one embodiment of the present invention encodes into the spectrum as shown in FIG. 21. The vertical and temporal high frequency component is multiplexed in the diagonal high frequency region of the temporal low frequency component. The encoded signal can be converted into the interlace scan signal without aliasing distortion.

The temporal high and vertical low frequency component (0–2.7 MHz, 0–120 TVL/PH, 15–30 Hz) is transmitted by the interlace format without aliasing confusion.

The transmitted interlace scan signal is compatible with existing NTSC receivers.

Figure 22:
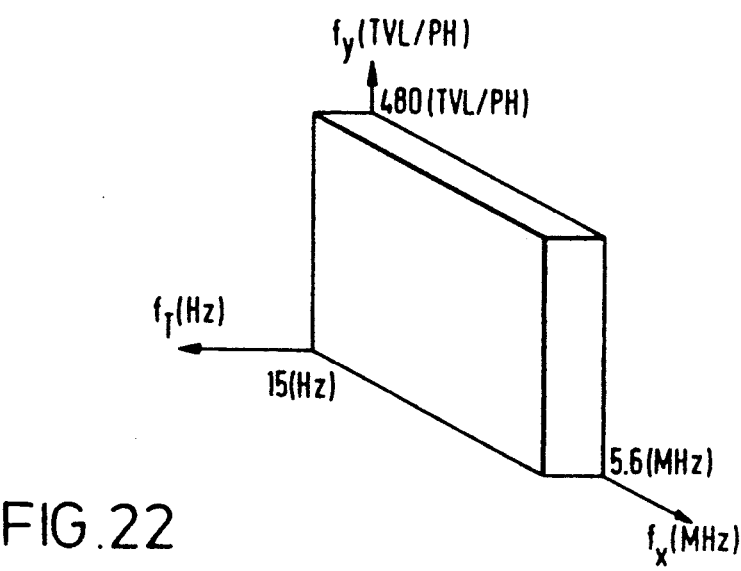

In the case of a stationary picture, the temporal low frequency component is transmitted as shown in FIG. 22.

FIG. 23 shows the principle of the multiplexing process. The horizontal high frequency component more than 2 MHz of the second field is interpolated from first field. The auxiliary signal $M_j$, which is the vertical and temporal high frequency component described above, is multiplexed into the interpolated signal $\Sigma h_i a_i$. The multiplexed signal $\Sigma h_i a_i + M_j$ is transmitted.

In the decoder, the auxiliary signal $M_j$ is obtained after subtracting the interpolated signal from the multiplexed signal $\Sigma h_i a_i + M_j$.

Figure 24:
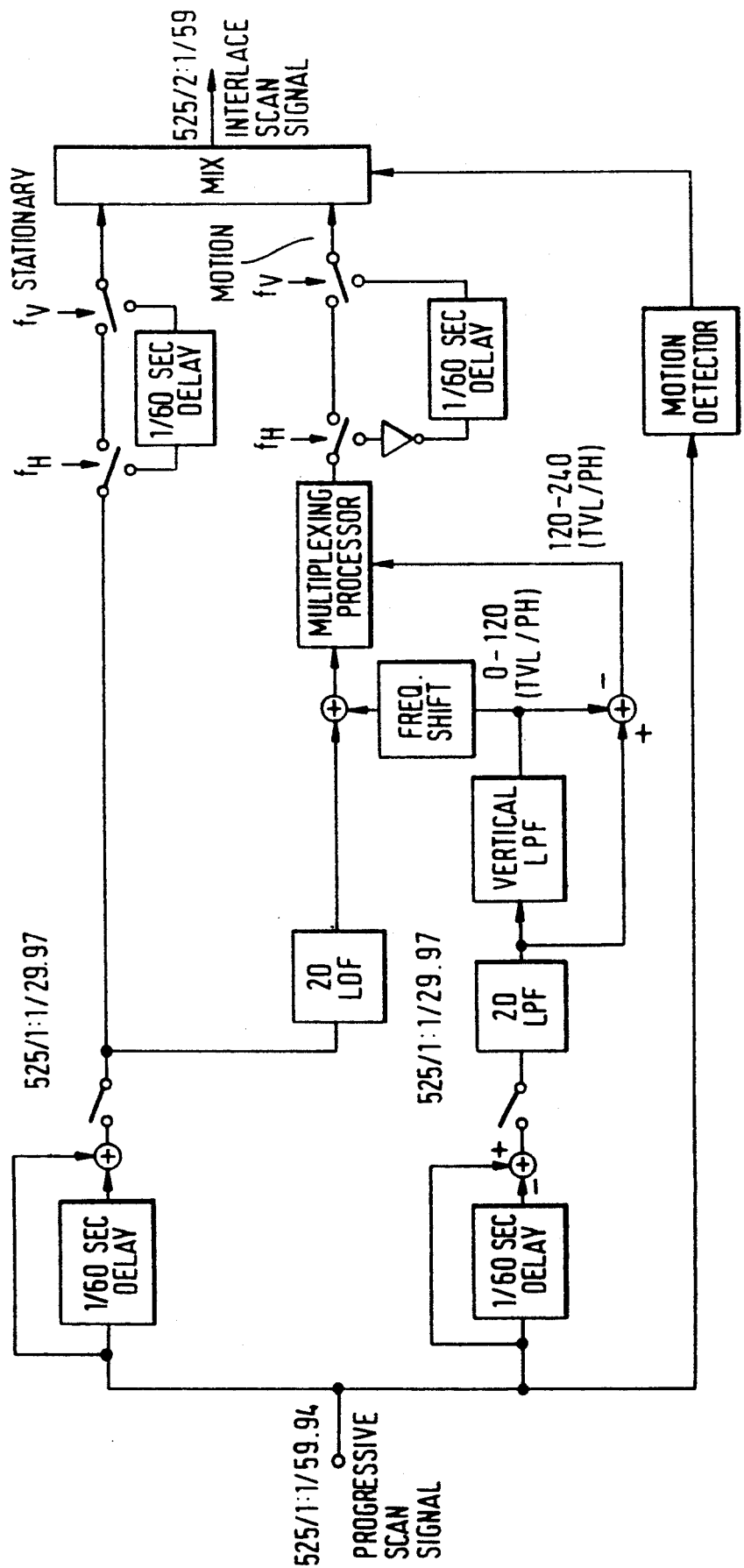
FIG. 24 is a block diagram showing a scan conversion encoder according to the embodiment of the present invention.

The block diagram of the scan conversion encoder according to the present invention is shown in FIG. 24. An input progressive scan signal is decomposed to the intra-frame average signal (temporal low) and the intra-frame difference signal (temporal high). These two decomposed signals are also progressive scan signals. These frame frequencies, however, are 29.97 Hz.

The intra-frame average signal presents vertical and horizontal resolution and the intra-frame difference signal presents temporal resolution.

In the motion mode, the diagonal high frequency component of the intra-frame difference signal is eliminated by a two dimensional filter as shown in FIG. 20. The intra-frame average signal is band-shaped by the two dimensional low pass filter.

The intra-frame difference signal is multiplexed into the diagonal high frequency region of the intra-frame average signals as shown in FIG. 21.

In the stationary mode, the intra-frame average signal is transmitted as shown in FIG. 22.

Figure 25:
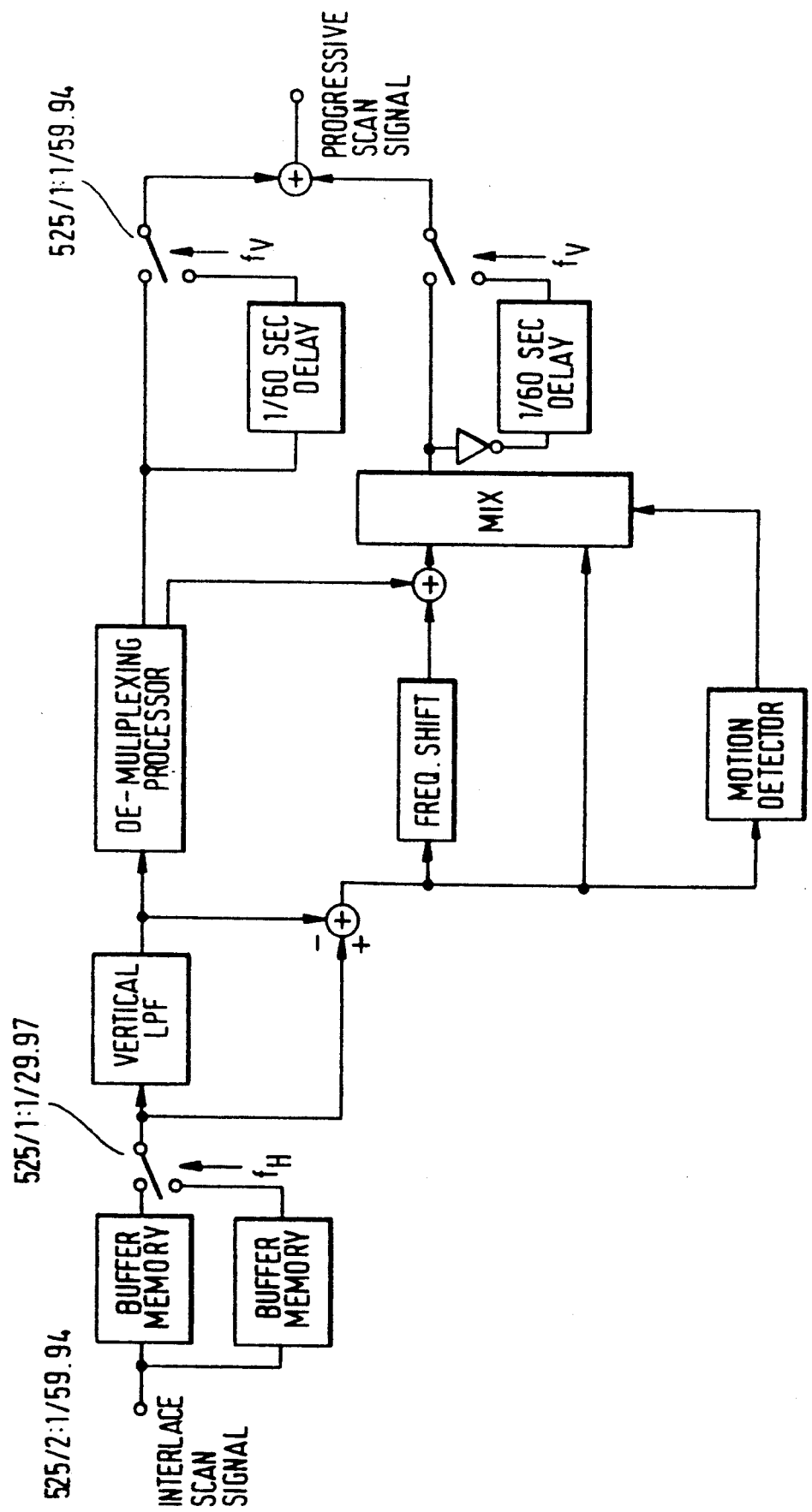
FIG. 25 is a block diagram showing a scan conversion decoder according to the embodiment of the present invention.

FIG. 25 shows a block diagram of the decoder according to the present invention. The first and the second fields of the interlace signal are converted to the progressive scan signal with frame frequency 29.97 Hz by the buffer memories. The vertical high frequency component (more than 360 TVL/PH) of the signal is separated by the vertical filter.

In the case of a stationary picture, the separated signal is the vertical high frequency component.

In the case of a motion picture, however, the separated signal is shifted to the temporal high frequency region. The multiplexed auxiliary signal, which is vertical and temporal high frequency component, is de-multiplexed by the de-multiplexing processor. These two signals are processed to the intra-frame difference signal.

According to the motion detected signal, the motion mode or the stationary mode is selected by the mixer circuit. The intra-frame average and difference signals are converted to progressive scan signals with frame frequency 59.94 Hz by field repitition. It is noted that the frame difference signal is phase altered by field.

Figure 26:
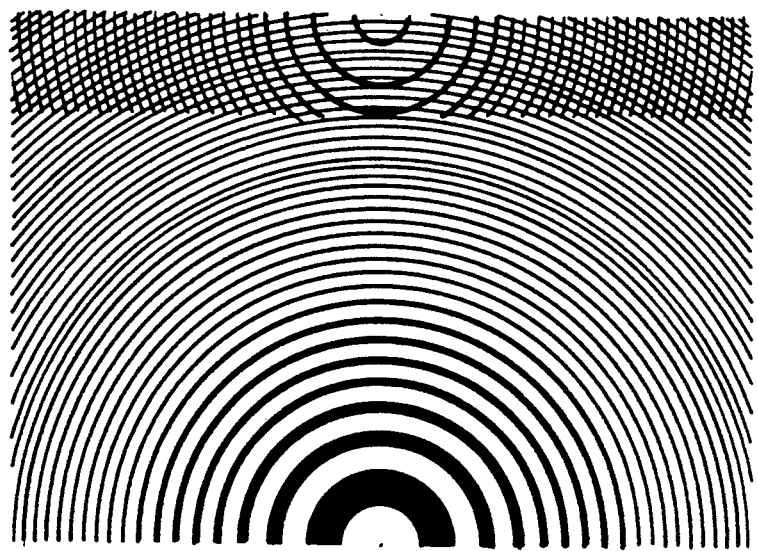
FIG. 26 is a test pattern picture reproduced by a conventional scan converter.

FIG. 26 shows the picture reproduced by the conventional scan converter. There is an aliasing distortion caused by the vertical and temporal high frequency component.

Figure 27:
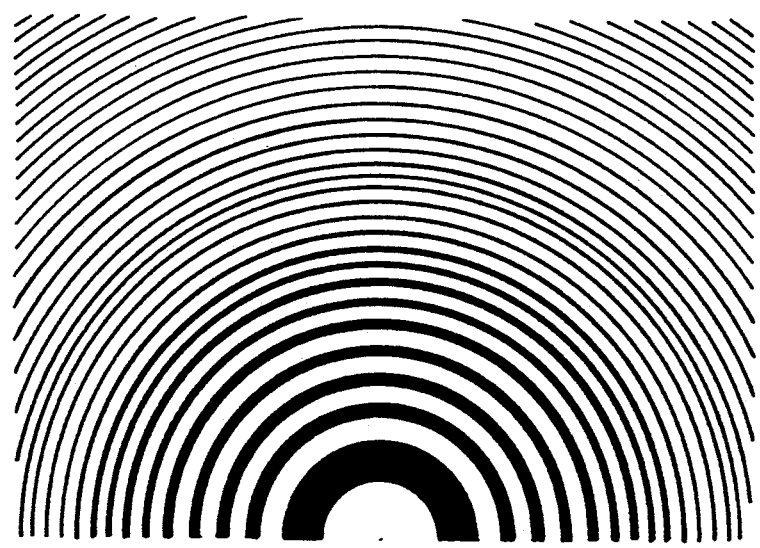
FIG. 27 is a test pattern picture reproduced by the scan converter according to the present invention.

FIG. 27 shows the picture reproduced by the scan converter according to the present invention. This scan converter improves the degradation.

As described above, the present invention can provide an extremely preferable compatible auxiliary signal multiplexed television system. In the case of the wide aspect television system, the present invention extends the diagonal resolution of the side panel signals. Horizontal resolution of the center panel signal is also extended up to 6.6 MHz (400 TVL/PH).

In the case of the scan conversion system, the present invention extends vertical resolution (360 TVL/PH) without aliasing distortion.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A compatible television signal encoder for encoding a television signal having a first signal and second signal, comprising:

dividing means for dividing the television signal into an auxiliary signal and a main signal having a first scanning field signal associated with said main signal, and a second scanning field signal associated with said main signal, said main signal including:

the first signal and low-frequency components of the second signal multiplexed with the first signal, interpolating means for producing an interpolating scanning field signal using the first scanning field signal of the main signal output from the dividing means;

replacing means for replacing the second scanning field signal of the main signal with the interpolating scanning field signal output from the interpolating means; and adding means for adding the auxiliary signal from the dividing means to the signal output from the replacing means.

2. A compatible television signal encoder of claim 1, further comprising:

first filter means for extracting a prescribed frequency component from the main signal divided by the dividing means;

second filter means for limiting the vertical band of the output extracted from the first filter means in a prescribed number of scanning lines;

switch means for selectively applying the first scanning field signal of the main signal to the interpolating means;

third filter means for limiting the vertical band of the auxiliary signal to the prescribed number of scanning lines; and frequency modulation means for shifting the output from the third filter means to the frequency band of the second scanning field signal.

3. A compatible television signal decoder for decoding a television signal having a main signal encoded on both a first field signal and an interpolated second field signal by using the first field signal and an auxiliary signal encoded on the interpolated second field signal, the main signal including a first signal and low-frequency components of second signal multiplexed in the first signal and the auxiliary signal, comprising:

interpolating means for producing a compensating field signal using the first scanning field signal of the television signal;

first adding means for separating the auxiliary signal by subtracting the compensating field signal output from the interpolating means from the second field signal output from the television signal;

frequency demodulation means for shifting the auxiliary signal to the original frequency; and second adding means for adding the second scanning field signal of the television signal and the compensating field signal output from the interpolating means.

4. A compatible television signal decoder of claim 3, further comprising:

filter means for limiting the television signal applied to the interpolating means to a prescribed frequency component;

first switch means for selectively applying the second scanning field signal of the auxiliary signal to the frequency demodulation; and second switch means for selectively applying the second scanning field signal of the auxiliary signal to the second adding means.

5. A compatible wide aspect television signal encoder for encoding a wide aspect television signal having a center panel signal and side panel signals, comprising:

dividing means for dividing the wide aspect television signal into an auxiliary signal and a main signal having a first scanning field signal associated with said main signal, and a second scanning field signal associated with said main signal, the main signal including:

the center panel signal and low-frequency components of the side panel signals multiplexed with the horizontal overscan regions of the center panel region; and the auxiliary signal including:

time expanded high frequency components of the side panel signals;

interpolating means for producing an interpolating scanning field signal using the first scanning field signal of the main signal output from the dividing mean;

replacing means for replacing the second scanning field signal of the main signal with the interpolating scanning field signal output from the interpolating means; and adding means for adding the auxiliary signal from the dividing means to the signal output from the replacing means.

6. A compatible television signal encoder of claim 5, further comprising:

first filter means for extracting a prescribed frequency component from the main signal divided by the dividing means;

second filter means for limiting the vertical band of the output extracted from the first filter means in a prescribed number of scanning lines;

switch means for selectively applying the first scanning field signal of the main signal to the interpolating means;

third filter means for limiting the vertical band of the auxiliary signal to the prescribed number of scanning lines; and frequency modulation means for shifting the output from the third filter means to the frequency band of the second scanning field signal.

7. A compatible wide aspect television signal decoder for decoding a wide aspect television signal having a main signal encoded on both a first field signal and an interpolated second field signal by using the first field signal and an auxiliary signal encoded on the interpolated second field signal, the main signal including a center panel signal and low-frequency components of side panel signals multiplexed in the horizontal overscan regions of the center panel signal and the auxiliary signal including time expanded high-frequency components of the side panel signals, comprising:
- interpolating means for producing a compensating field signal using the first scanning field signal of the television signal;
- first adding means for separating the auxiliary signal by subtracting the compensating field signal output from the interpolating means from the second field signal output from the television signal;
- frequency demodulation means for shifting the auxiliary signal to the original frequency; and
- second adding means for adding the second scanning field signal of the television signal and the compensating field signal second output from the interpolating means.

8. A compatible wide aspect television signal decoder of claim 7, further comprising:
- filter means for limiting the television signal applied to the interpolating means to a prescribed frequency component;
- first switch means for selectively applying the second scanning field signal of the auxiliary signal to the frequency demodulation; and
- second switch means for selectively applying the second scanning field signal of the auxiliary signal to the second adding means.

* * * * *